March 23, 1954  Z. W. WHITEHOUSE ET AL  2,672,663
PROCEDURE AND APPARATUS FOR STRIPPING INGOTS FROM MOLDS
Filed April 4, 1950  9 Sheets-Sheet 1
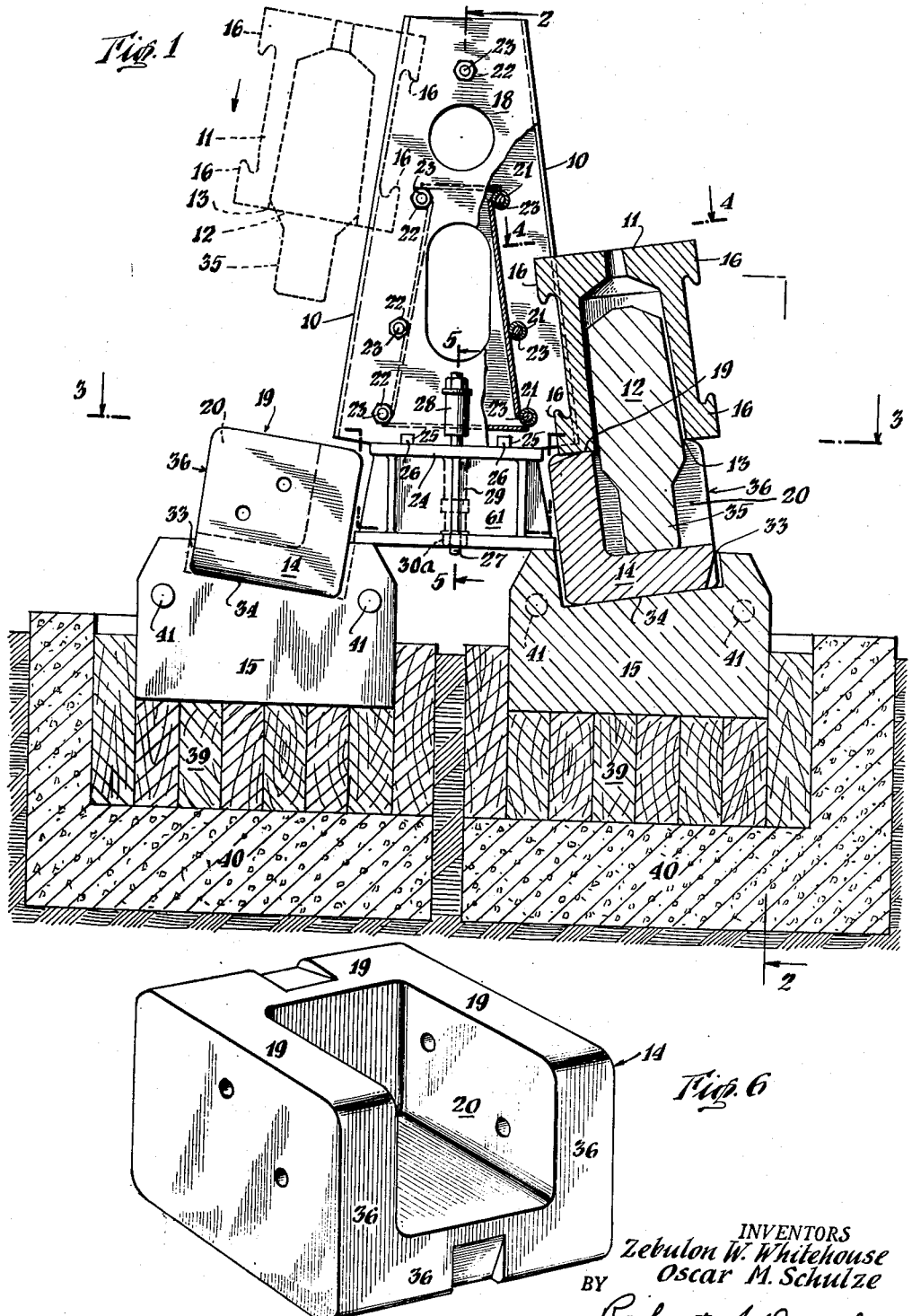
INVENTORS
Zebulon W. Whitehouse
Oscar M. Schulze
BY Robert A. Dunham
ATTORNEY

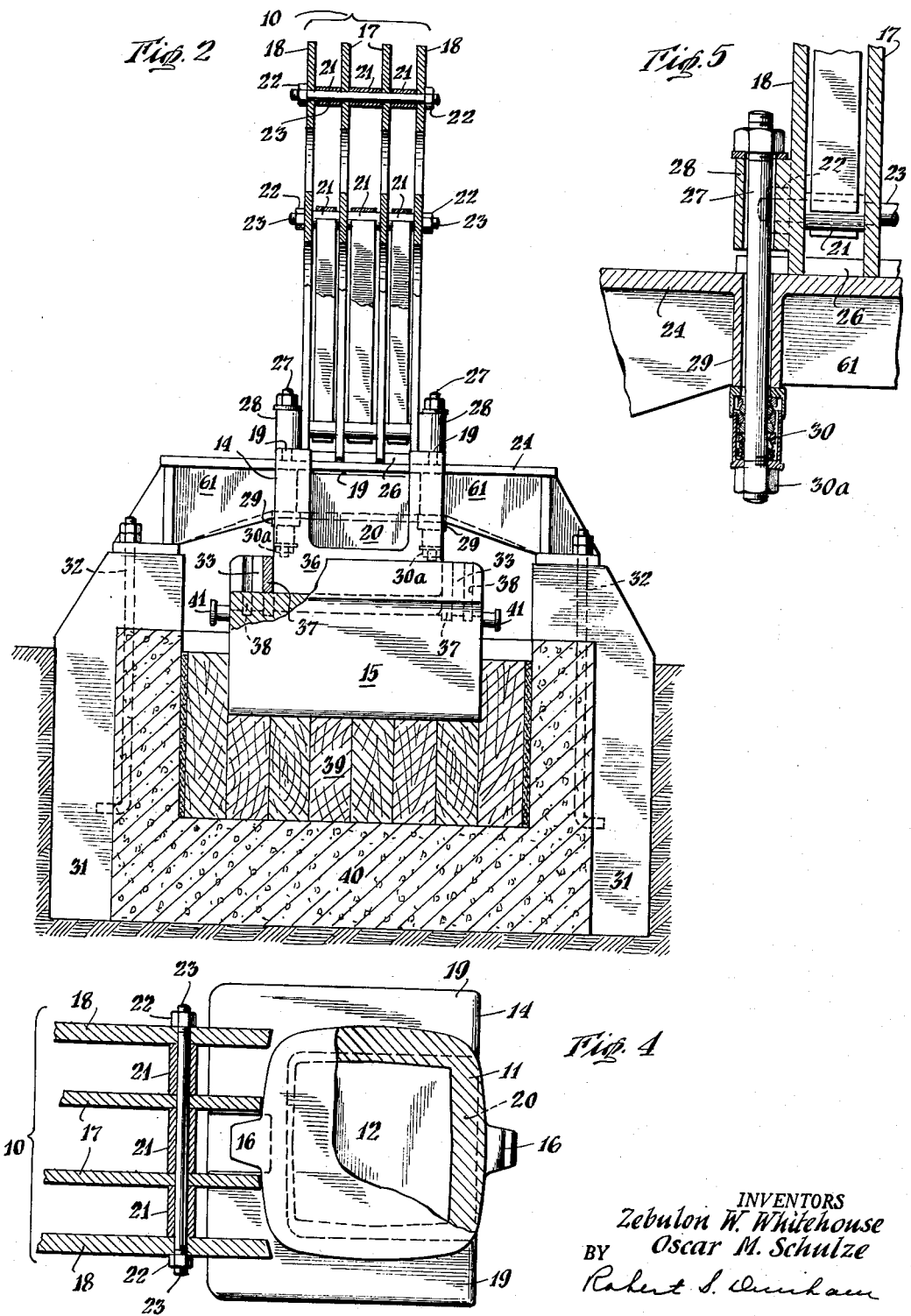

March 23, 1954   Z. W. WHITEHOUSE ET AL   2,672,663
PROCEDURE AND APPARATUS FOR STRIPPING INGOTS FROM MOLDS
Filed April 4, 1950                             9 Sheets-Sheet 3
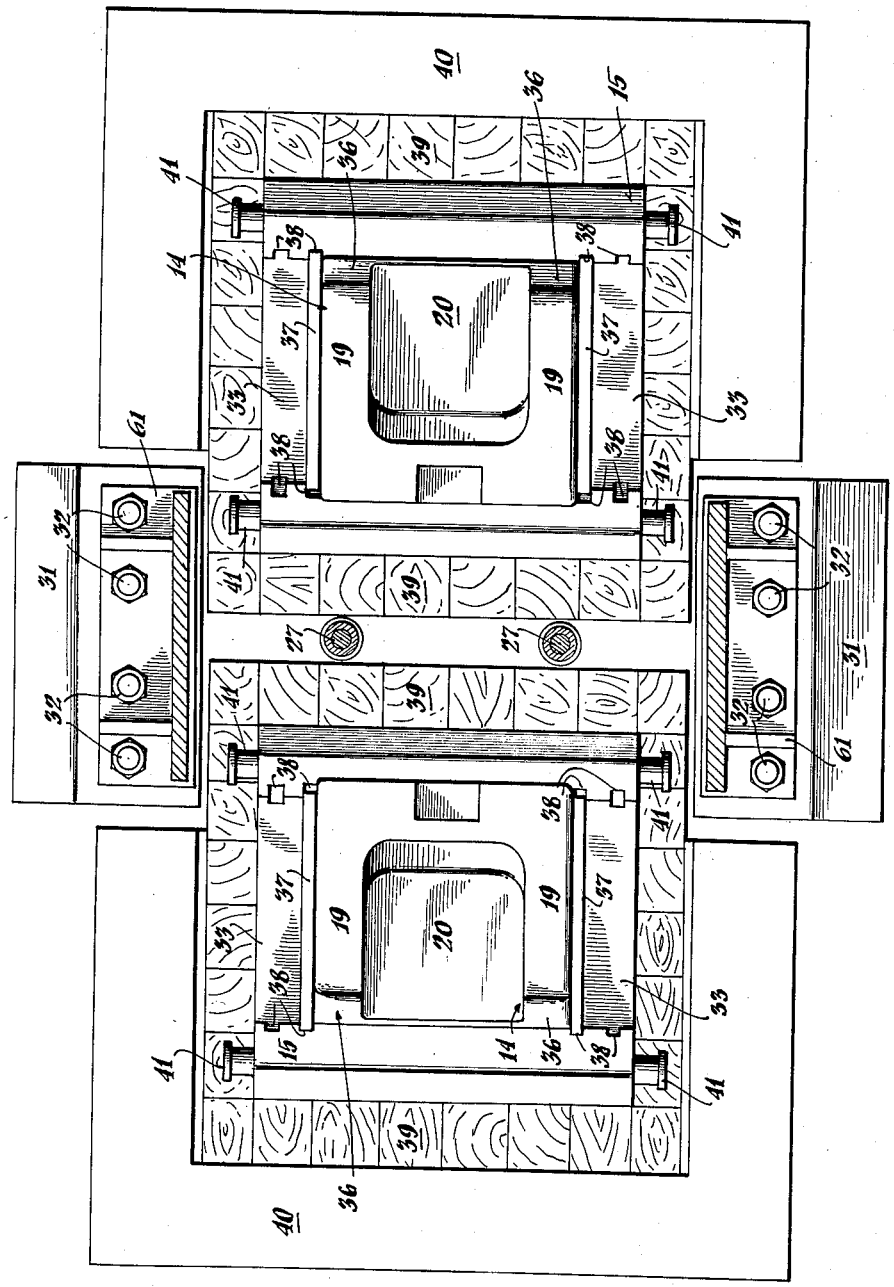
INVENTOR.
Zebulon W. Whitehouse
Oscar M. Schulze
BY
Robert S. Dunham
ATTORNEY March 23, 1954   Z. W. WHITEHOUSE ET AL   2,672,663
PROCEDURE AND APPARATUS FOR STRIPPING INGOTS FROM MOLDS
Filed April 4, 1950   9 Sheets-Sheet 4
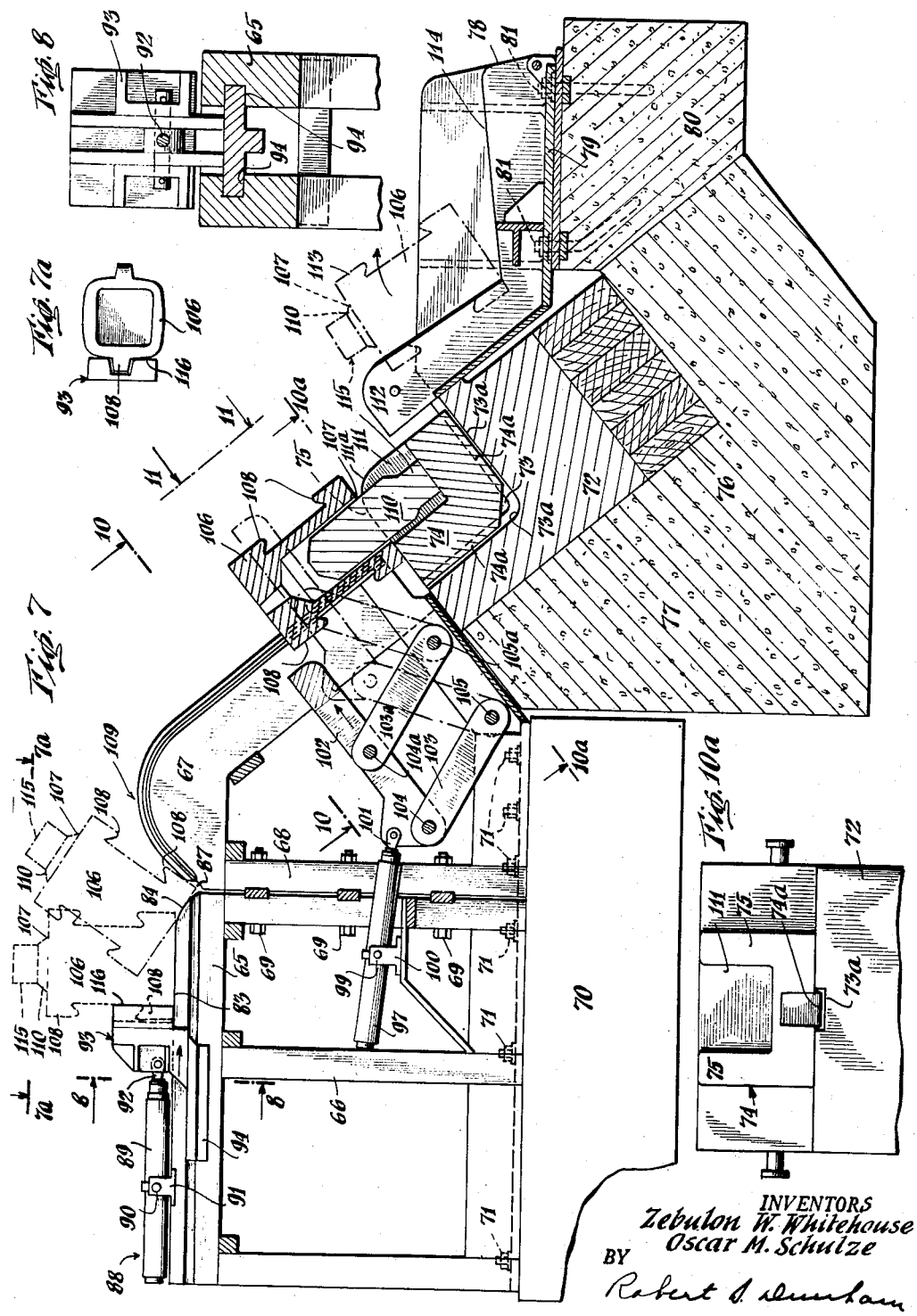
INVENTORS
Zebulon W. Whitehouse
Oscar M. Schulze
BY
Robert S. Dunham
ATTORNEY March 23, 1954  Z. W. WHITEHOUSE ET AL  2,672,663
PROCEDURE AND APPARATUS FOR STRIPPING INGOTS FROM MOLDS
Filed April 4, 1950  9 Sheets-Sheet 5
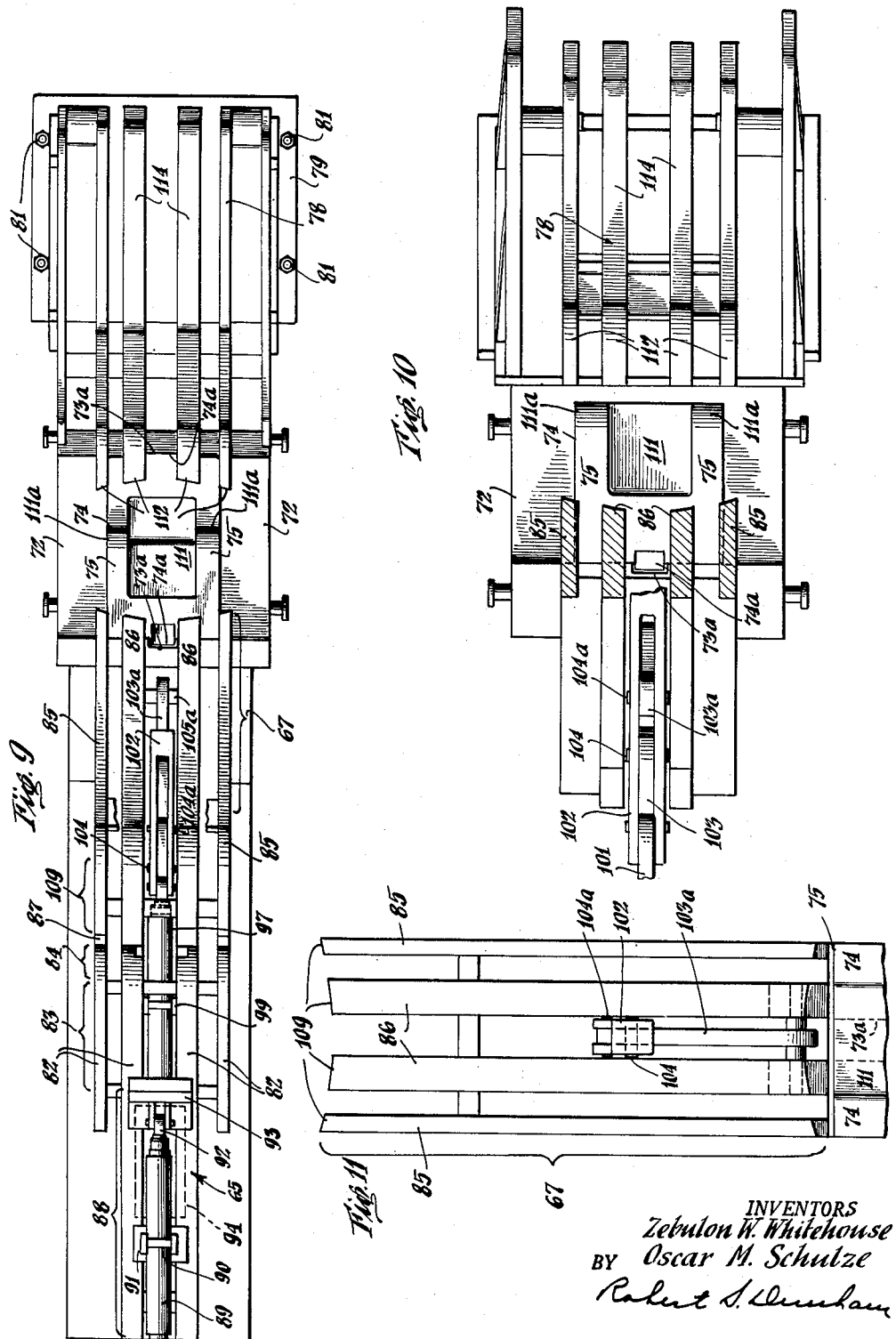
INVENTORS
Zebulon W. Whitehouse
BY Oscar M. Schulze
ATTORNEY

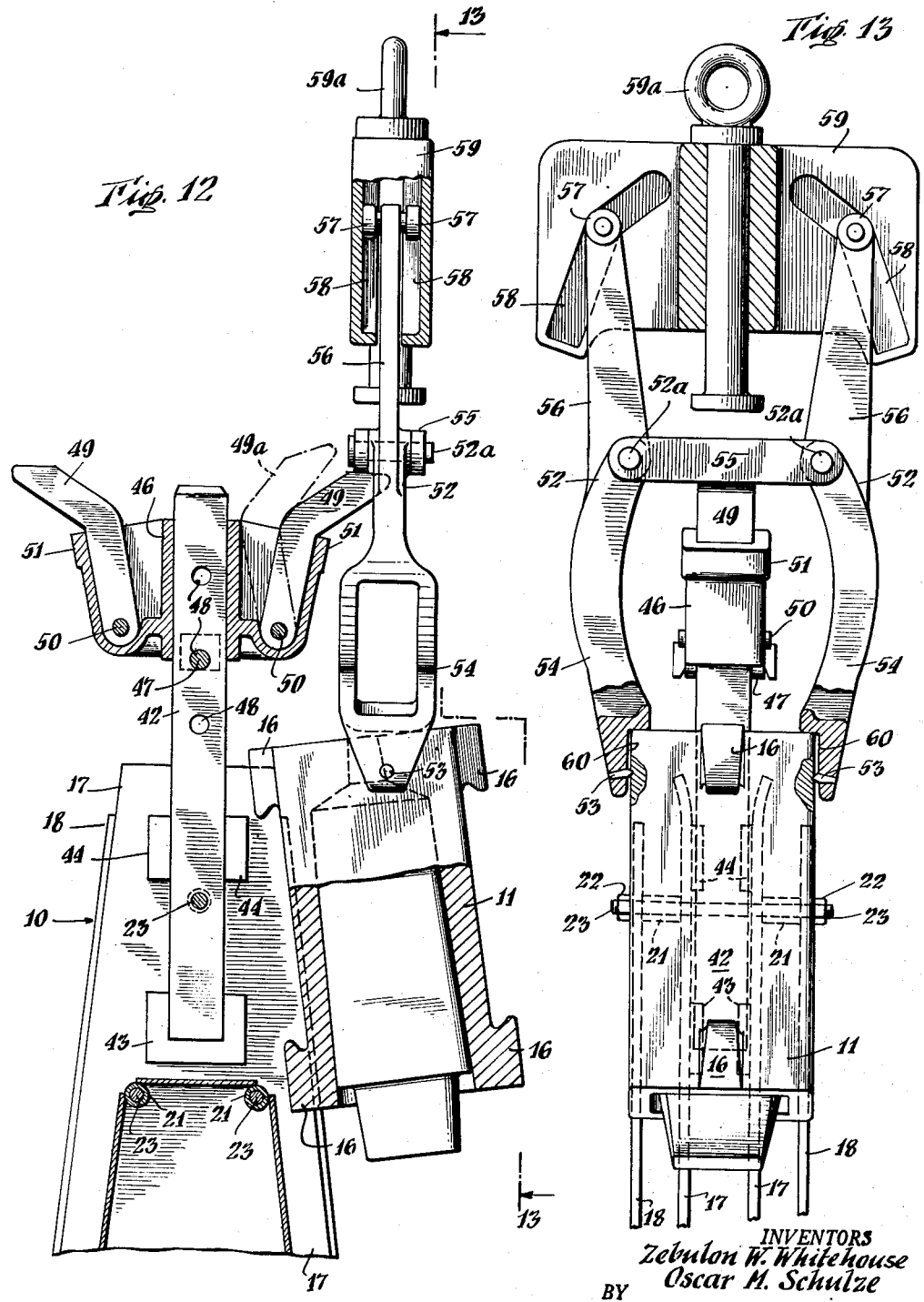

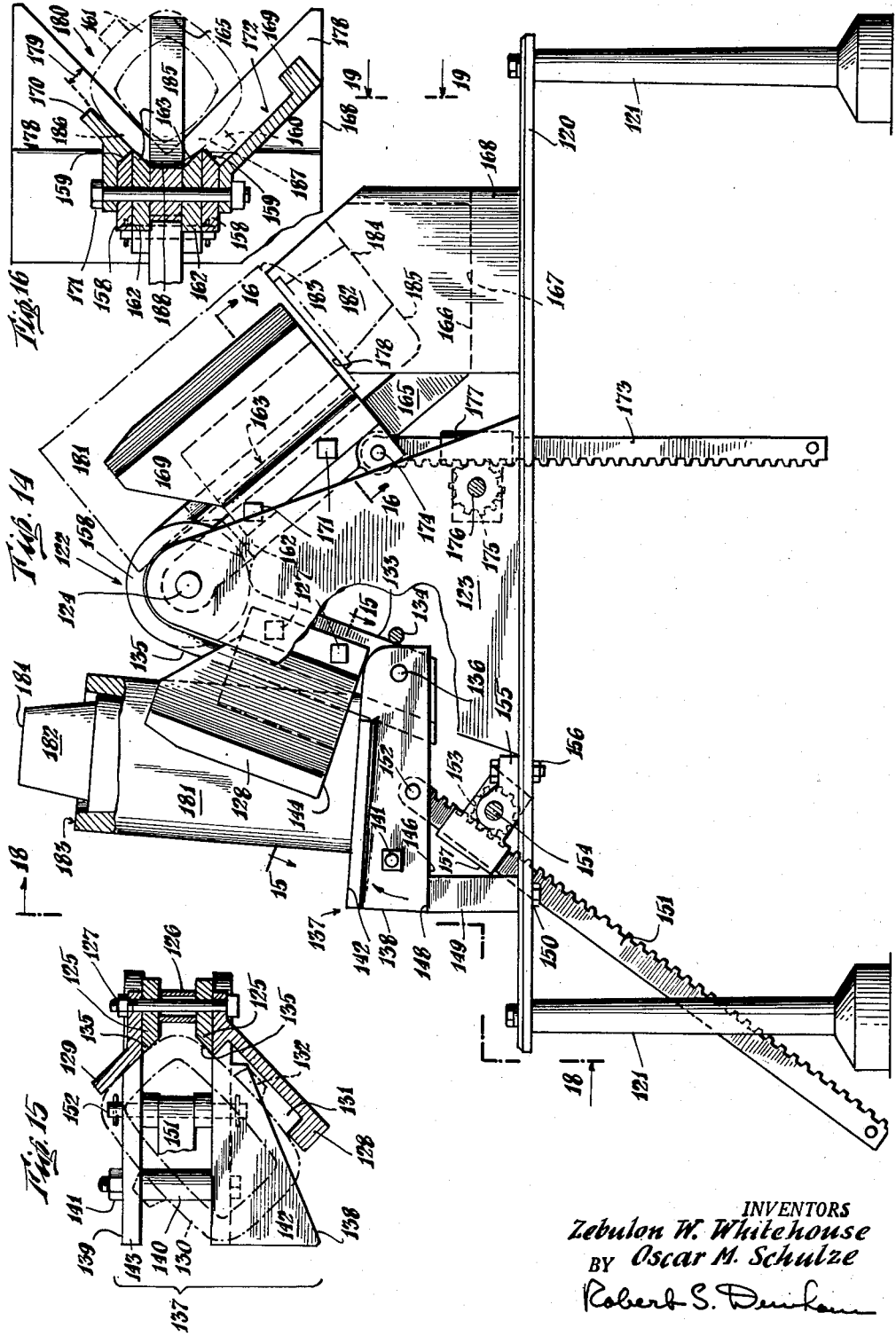

March 23, 1954   Z. W. WHITEHOUSE ET AL   2,672,663
PROCEDURE AND APPARATUS FOR STRIPPING INGOTS FROM MOLDS
Filed April 4, 1950                                              9 Sheets-Sheet 8
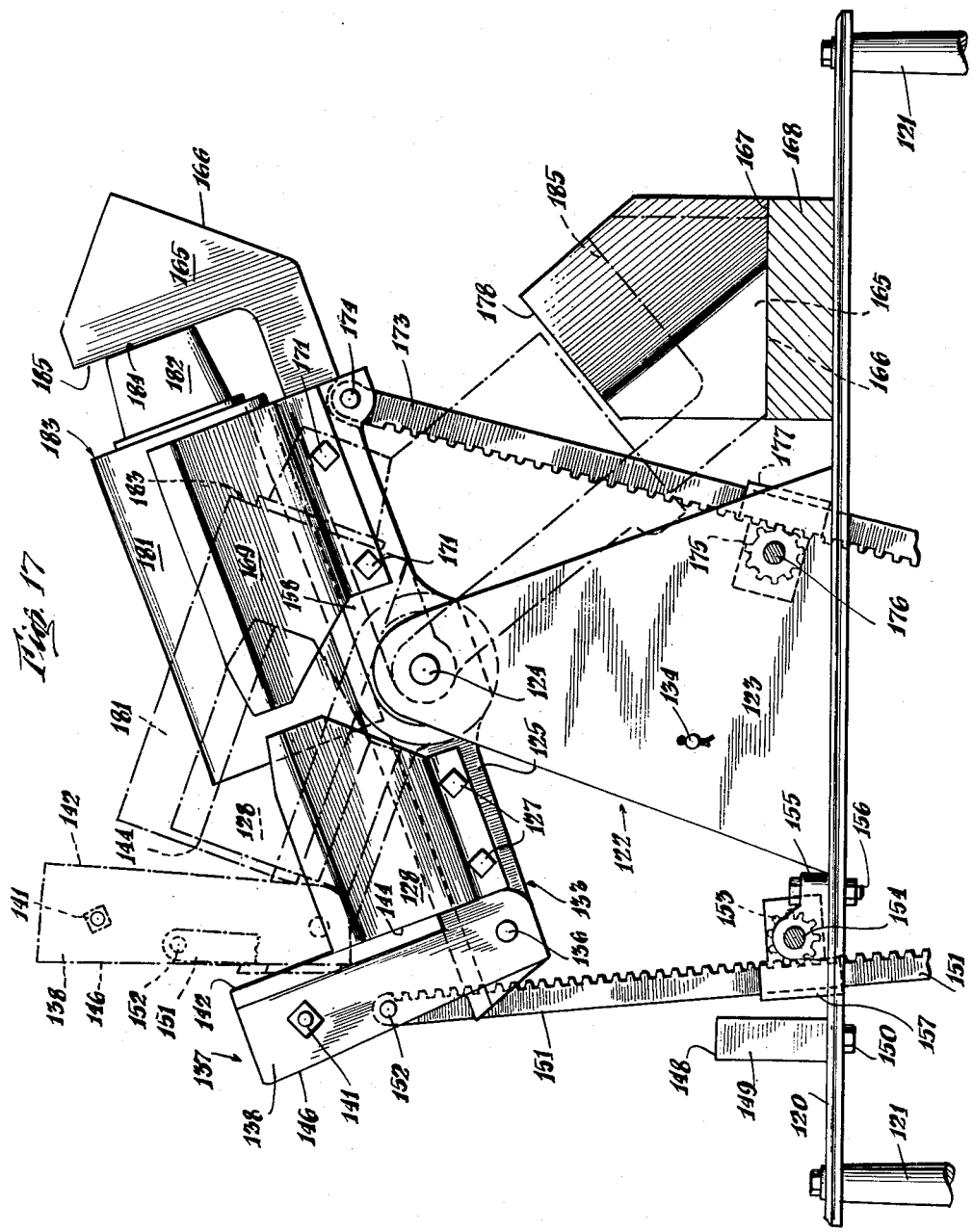
INVENTORS
Zebulon W. Whitehouse
Oscar M. Schulze
BY
Robert S. Dunham
ATTORNEY March 23, 1954     Z. W. WHITEHOUSE ET AL     2,672,663
PROCEDURE AND APPARATUS FOR STRIPPING INGOTS FROM MOLDS
Filed April 4, 1950                                          9 Sheets-Sheet 9
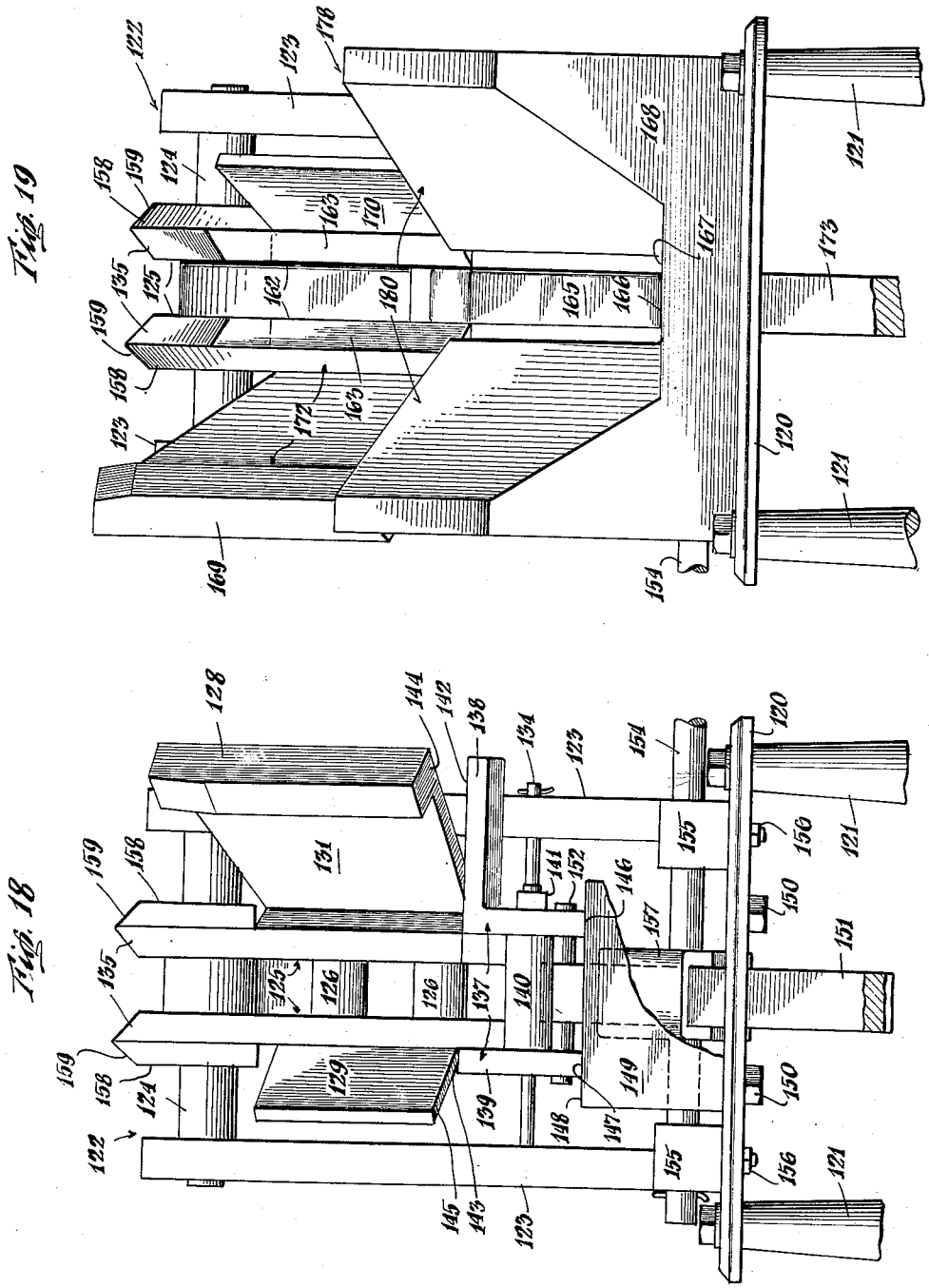
INVENTORS
Zebulon W. Whitehouse
Oscar M. Schulze
BY Robert S. Dunham
ATTORNEY Patented Mar. 23, 1954

2,672,663

UNITED STATES PATENT OFFICE 2,672,663

PROCEDURE AND APPARATUS FOR STRIPPING INGOTS FROM MOLDS

Zebulon W. Whitehouse and Oscar M. Schulze, Canton, Ohio, assignors to Republic Steel Corporation, Cleveland, Ohio, a corporation of New Jersey Application April 4, 1950, Serial No. 153,914

15 Claims. (Cl. 22—95)

This invention relates to the removal, or stripping of ingots from molds and more particularly to a method and means of ingot stripping by impact.

The invention is directed especially to the problem of removing ingots which stick in the molds in spite of the fact that the interior of the mold has been previously coated with some lubricant substance such as pitch, tar or sugar. The usual devices for removing stickers are ingot-pushing mechanisms which act directly on the ingot, using a plunger pusher which is inserted through the small bottom opening of the typical ingot mold and exerts force to push the sticking ingot out the larger top opening. The exertion of considerable force directly upon such a limited area of the ingot surface may deform the ingot and cause it to bind against the side walls of the ingot so that it is necessary ultimately to cut away the mold, thereby destroying it, in order to recover the ingot.

An object of the invention is to provide a method and apparatus which will effectively and readily strip ingots from their enclosing molds without damaging the ingot or without exerting any force directly upon the ingot.

A further object of the invention is to provide a means wherein the removal of the ingot from the mold is performed by an apparatus requiring no moving parts for the actual stripping operation.

Another object of the invention is to utilize the force of gravity to effect the stripping of the ingot from the mold and to provide an apparatus wherein the stripping force can be readily changed.

A still further object of the invention is to provide a stripping apparatus wherein the parts are separately supported from one another so that the transmission of shock during the stripping operation is minimized to reduce the vibration and wear on the several parts of the apparatus.

The apparatus and method of the invention provide a means for guiding a moving ingot-enclosing mold along a path and abruptly arresting the mold while permitting the ingot to continue its movement. For a complete description of three forms of apparatus for implementing the invention, reference is made to the drawings, wherein:

Fig. 1 is a side view with parts broken away of one form of the invention;

Fig. 2 is an end view of the apparatus as viewed along the line 2—2 in Fig. 1;

Fig. 3 is a horizontal cross-section taken along the line 3—3 in Fig. 1;

Fig. 4 is a detailed partial sectional view showing the relationship of the mold to the guiding means and the arresting means taken along the line 4—4 in Fig. 1;

Fig. 5 is a detailed partial sectional view taken along the line 5—5 in Fig. 1;

Fig. 6 is a perspective view of the removable mold-arresting means;

Fig. 7 is a sectional side view of another form of apparatus embodying the invention;

Fig. 7a is a view taken along the line 7a—7a in Fig. 7;

Fig. 8 is a detailed sectional view taken along the line 8—8 in Fig. 7;

Fig. 9 is a plan view of the apparatus shown in Fig. 7;

Fig. 10 is a partial sectional view taken along the line 10—10 in Fig. 7;

Fig. 10a is a top view of the anvil taken along the line 10a—10a;

Fig. 11 is a face view of the apparatus shown in Fig. 7 taken along the line 11—11 in that figure;

Fig. 12 is a side view, partially in section, of a tong release device for use in conjunction with the apparatus shown in Fig. 1;

Fig. 13 is a sectional view taken along the line 13—13 in Fig. 12;

Fig. 14 is a side elevation of an additional form of apparatus embodying the invention;

Fig. 15 is a cross section taken along the line 15—15 in Fig. 14;

Fig. 16 is a cross section taken along the line 16—16 in Fig. 14;

Fig. 17 is a side view of the apparatus of Fig. 14 showing two phases of the stripping operation;

Fig. 18 is an end elevation as viewed from line 18—18 in Fig. 14, and

Fig. 19 is an end elevation as viewed from line 19—19 in Fig. 14.

The apparatus shown in Figs. 1 and 2 includes a pair of inclined trackways 10, each adapted to guide and define the path of an ingot-containing mold 11 as the latter falls endwise along the said trackway, with the open end 13 downward as shown in Fig. 1. An anvil 14 is positioned in a sow block 15 at the lower end of each trackway 10 and is adapted to arrest the mold 11 as the latter slides down the trackway under the force of gravity.

The trackway 10 is comprised of a number of parallel guide plates including outer plates 18 and inner plates 17. The plates are spaced apart by suitable separators 21 and are held together by nuts 22 and bolts 23. The inner guide plates 17 are spaced apart to accommodate the lugs 16 on the mold 11 so that the mold may be positively guided to strike the anvil 14 squarely. The position of the mold 11 on the trackway 10 is illustrated in Fig. 4 wherein it will be seen that the lugs 16 are received between the interior plates 17 on the trackway 10, the spacing of the plates being suitably dimensioned for such purpose. The outer plates 18 and the inner plates 17 which form the trackway are positioned with respect to each other at their mold-receiving edges so as to form a concave trackway to cradle the mold during its downward movement. That is to say, the outer guide plates 18 are wider, between their opposite sloping edges, than the plates 17, so that they may act as stabilizers for the mold during the travel of the latter. The slope of the inclined trackway and the length of the trackway, and the spacing between the guide plates 17 and 18 may be changed to suit the particular requirements of the ingots which are to be stripped.

The guide plates of the trackway 10 are mounted and rest on the base 24. Rectangular notches 25 are provided in the plates 17 and 18, and are dimensioned to fit loosely over square transverse bars 26 which are fixed on the base 24 and are adapted to maintain the guide plates of the trackway in proper orientation. The trackway 10 is secured to the base 24 by the bolts 27 which extend upwardly through the lugs 28 provided on the outer plates 18 of the trackway 10. The bolts extend downwardly through the base plate 24 and the base lugs 29. A suitable enclosed friction spring 30 of high power absorption value is mounted at the lower end of each lug 29 and around the bolt 27, so as to be held under compression when the bottom nut 30a is tightened up on the bolt. This means of securing the guide trackway 10 to the base provides a sufficiently secure footing for the trackway and at the same time does not allow any jar, shake or like vibration of the guide plates to be directly transmitted to the base 24, also no jar, shock or vibration is transmitted to the mast, from the base, when the impact takes place. Since the bolts 27 have a somewhat loose fit, laterally, in the parts thereby clamped under spring pressure, the mast structure constituted by the plates 17 and 18 can rock very slightly upon the bars 26, i. e. against the spring pressure which otherwise holds the mast squarely on the base 24.

The base 24 is supported on two separate concrete foundation piers 31 (see Fig. 3) which are not a part of the foundation for the other parts of the apparatus. It has been found that independent foundation piers are desirable so that no shock is transmitted from the other parts of the apparatus (and particularly from the sow blocks 15) to the guide support base 24. Specifically, the base 24 has a supporting bridge structure 61 which is suitably secured to the foundation piers 31, such as by bolts 32. It will be noted that the base 24, supported by its bridge part 61, lies between the sow blocks 15, and that the sow blocks and the anvils 14 disposed in the sow blocks are entirely independent and at no point contact the trackway 10, the base 24 or its supporting bridge 61.

The sow blocks 15 are so located beneath the trackway 10 that the anvils 14 may be removably positioned in the sow blocks in proper alignment directly under the guides 17 and 18. An anvil receiving recess 33 is provided in each sow block. The recesses 33 have inclined floors 34 so that the anvils 14, when set in the recesses, are disposed at an angle such that the upper mold-arresting face 19 of each is at right angles to the inclined edges of the guide plates 17 and 18 of the respective trackway 10. The U-shaped mold-arresting face 19 on the top surface of each anvil is slightly larger in contour than the inside of the mold, and a pocket, or opening 20 is thereby provided in the anvil which is of such size that there is room for the sprue or head 35 of an ingot 12 and is also of sufficient size to receive a part of the ingot as it moves out of the mold and into the pocket, or opening 20, in the anvil.

It has been found practical to provide the anvil with two working faces in such manner that by turning the anvil a new working surface may be brought into position at the lower end of the trackway. Fig. 6, which is a perspective view of an anvil, shows the opening 20 with the three parts or legs of the mold-arresting face 19 in the upward position. By turning and reversing the anvil the corresponding three parts or legs of the other U-shaped face 36 may be brought into position to constitute the mold-arresting surface with the opening in the face 36 correspondingly sized to receive the ingot as it is stripped from the mold. By thus providing the anvils with two working faces that can be alternately or successively used, their service life can be doubled.

It will be noted that since the anvils are removable from the recesses 33 of the sow blocks 15 they are readily interchangeable, so that anvils of various sizes to correspond to a range of the mold sizes may be used. The anvils are held in the proper central position in the sow blocks 15 by keeper plates 37 which are removably positioned in keeper plate slots 38, (see Figs. 2 and 3; the plate 37 being omitted, for clarity in Fig. 1). The sow blocks may be provided with a number of keeper plate slots to accommodate anvils of different widths; for the purpose of illustration, two such sets of keeper plate slots have been indicated at each side.

Each sow block 15 is mounted in a nest of wooden timbers 39 which in turn are positioned in a separate concrete foundation 40. In practice it has been found that oaken timbers are suitable to support the sow blocks and to cushion the blow between the sow block and the foundation 40. However, it will be appreciated that any suitable cushioning material may be substituted. Referring to Fig. 1 and Fig. 3 it will be noted that the foundation 40 for one sow block is entirely separate from the foundation 40 for the other sow block and from the foundation piers 31 for the trackway 10. Thus the several parts are insulated against shocks which might be transmitted from one part of the apparatus to the other. By carrying the several parts of the apparatus on independent supporting foundations, breakage in the various parts of the stripper due to shock is avoided. Each sow block is provided with lugs 41 so that it may be removed from its position in the nest of wooden timbers 39 for the purposes of replacing the sow block or the supporting timbers.

The operation of the stripper may be described as follows:

An ingot-containing mold 11 having an open end 13 through which the ingot is removable (when freed from tight engagement) is inverted so that the open end is downward and the mold is lifted by a crane or other suitable means to the upper end of the inclined trackway 10, the dotted line position shown in Fig. 1. Simply by way of illustration, the ingot may be steel, having a weight which is limited only by the size of the apparatus as built; for example, with one particular machine, ingots weighing up to 25,000 lbs. have been successfully stripped, the total weight of such an ingot with its mold being about 33,000 lbs. The mold is placed on the trackway so that the lugs 16 on the inboard side of the mold are between the inner guide plates 17 as shown in Fig. 4 and the side of the mold rests against the inclined edges of the plates 17. In the case of molds having a relative size larger than the one actually indicated in Fig. 4, the inboard side of the mold would also overlie the inclined edges of the outer plates 18. The crane thereafter releases the mold 11 and it slides down the trackway 10 by the force of gravity, gaining momentum during its slide. At the lower end of the trackway 10 the mold 11 strikes the arresting face 19 of the anvil which suddenly stops the mold. The ingot 12 in the mold, being above the opening 20 in the anvil, is not arrested by the anvil face 19. The shock of the mold striking the anvil and the inertia of movement of the ingot jars it loose from the mold and thereby effects the stripping of the ingot. The ingot continues its downward movement into the opening or pocket 20. When the mold and the ingot have thus respectively reached the full line positions shown in Fig. 1 with the ingot 12 stripped from the mold 11 as described, they may be separately removed by crane tongs or other suitable lifting means, in preparation for another stripping operation.

It will be noted that with the two inclined trackways 10 shown in Fig. 1 and the two anvils disposed at the lower end of each trackway it is possible to conduct two stripping operations at the same time, that is, by releasing a mold-containing ingot down each side of the dual trackway.

With the double guide to provide for two stripping operations at one time one side of the stripper can be set up for one range of mold sizes and the other for another range so that several sizes of molds can be accommodated at one setting of the stripper.

In order to facilitate the release of the inverted ingot-containing mold at the upper end of the trackway 10 it has been found practical to affix to the trackway a mechanism for triggering or opening the tongs by which the mold is carried. Such a device is illustrated in Figs. 12 and 13 which show, in part, the upper end of the inclined trackway 10 with the tong release mast 42 positioned therein. A suitable manner for stepping the mast in the guide plates of the trackway 10 is to provide socket blocks 43 which support the foot of the mast and side socket blocks 44 to maintain the mast in vertical position. The socket blocks may be welded or otherwise suitably affixed to the opposed faces of the inner guide plates 17, as shown in Figs. 12 and 13. The mast is also held in position by the bolt 23 which is part of the trackway assembly. The mast extends vertically above the guide plates of the trackway and has a bracket 46 which, by virtue of its central sleeve-like portion around the mast, is slidably mounted thereon and may be supported at various levels by a pin 47 that can be inserted in any one of several transverse holes 48 in the mast. Thus the bracket can be adjusted in vertical position by moving it up or down and locating the pin 47 in the correspondingly selected hole 48.

The bracket 46 supports trip members or arms 49 which are pivotally fixed in the bracket by pins 50, and are arranged so that their ends extend generally upward and outward above the trackways 10, respectively. The trips are mounted so that each is free to swing at the upper end from the normal, full line position (Fig. 12) to an inner position such as indicated in dotted lines 49a. It has been found advisable to permit this freedom of motion of the upper ends of the trips to prevent bending or breakage of the parts, e. g. in the event that the trips are accidentally bumped in operation. In other respects as well, this retractively swinging or yieldable mounting of the trips allows for greater ease in alignment of the crane and mold with the stripper. The trips are supported in the full line position, i. e. against dropping below such position, by the fence or guard portions 51 on the bracket 46.

The tong release device may be employed with a tong or crane arrangement such as shown in Figs. 12 and 13 wherein the tong members 52 are pivoted centrally at 52a to a fulcrum bracket or cross-piece 55, the upper arms 56 of the tongs having rollers 57 journalled in the upper ends thereof. The rollers 57 run in sloping keyways 58 formed in the crane mast or head 59 and oriented so that they diverge along downward paths in the crane mast 59. The top of the mast (indicated simply by the ring 59a) is suitably hung from a crane, e. g. in the usual manner, on multiple sheaved blocks (not shown) carrying the crane cable, and may be moved vertically and in effect independently of the tongs 52 and the fulcrum bracket 55 except to the extent that the latter parts are caused to move to an engaged position.

When the lower arms of the tongs engage a mold which is to be lifted, the projecting hardened steel bits 53 on the work-engaging faces 60 of the lower arms 54 exert a clamping action upon the mold as the rollers 57 mounted on the upper arms 56 move along the diverging keyways 58 in the crane mast 59. The bits or pins 53 have sharp pointed ends which dig into the side of the mold to assure a firm hold.

As the weight of the mold is increasingly supported by the tongs the frictional holding action of work-engaging faces 60 of the tongs, aided by the bits 53, increases because of the outward movement of the upper arms as their associated rollers 57 move along the diverging keyways 58. The effect is similar to that achieved by a pair of ice tongs, the construction being such that the load cannot be released while it is suspended, i. e., the weight of the load must be released before the tongs will move apart.

As the crane holding the inverted mold between the tongs 52 is swung into position alongside the inclined trackway 10 the mold is lowered so that the trip 49 contacts the fulcrum bracket 55 of the tongs. As the crane continues to lower the mold 11 the load becomes supported on the trip 49 which is in engagement with the fulcrum bracket. The tongs are relieved of their load and the lower ends 54 of the tongs and the projecting bits 53 thereon release the mold and the latter begins its sliding descent down the trackway 10. It will be noted from Fig. 13 that the tongs do not engage the lugs 16 on the mold because the lugs are utilized as guiding means for the mold in its sliding descent along the trackway 10. It has been found desirable to pick up the mold on the outboard side of the vertical central axis as shown in Fig. 12 so that the mold will be suspended at a slight angle corresponding to the slope of the inclined trackway 10.

It will be noted that in Figs. 12 and 13 the inner guide plates 17 extend slightly above the outer guide plates 18 and flare slightly outwardly so that the mold lugs 16 may be received more easily between the guide plates 17, to insure that the mold is properly centered in the trackway.

Another form in which the invention may be embodied is shown in Figs. 7 to 11. The apparatus includes an elevated mold-receiving platform 65 supported on a frame 66. Adjacent to and abutting the platform 65 is an inclined trackway 67 mounted on a frame 68. The platform frame 66 and the trackway frame 68 may be suitably secured together by means such as bolts 69 and bolted to foundation pier 70 by suitable means, such as bolts 71. Sow block 72 is angularly disposed at the lower end of the inclined trackway 67 and is provided with a recess 73 to receive an anvil 74 which is angularly oriented so that its mold-engaging face 75 is at right angles to the inclined edges of the trackway 67. The sow block is supported by wooden timbers 76, or other suitable cushioning material in a concrete foundation 77. It will be noted that the anvil 74 may be essentially similar to the anvil 14 in Figs. 1 to 6, selectively usable in a plurality of positions. The sow block 72 may be similarly adapted for removably supporting the anvil and although it may include similar means (as in Figs. 2 and 3) of adjustable character to retain different sizes of anvils, the block shown has a groove 73a across the bottom and side face of its recess 73 (i. e. longitudinally of the trackway) to receive a cooperating rib 74a on the anvil 74, such rib being provided on all anvils, of various sizes, to be used with this apparatus.

A mold-receiving bin 78 is supported on a base plate 79 which is secured by bolts 81 to a separate concrete foundation 80. It will be noted that the foundations for the platform and trackway, for the sow block 72, and for the mold-receiving bin 78 are all separate to prevent the transmission of shock vibrations through the entire apparatus. The mold-receiving platform 65 is comprised of vertical plates 82 forming, in part, a horizontal mold-receiving surface 83, and in part, a downwardly curved mold-tumbling surface 84, said last-mentioned surface being adjacent to the inclined trackway 67.

The inclined trackway is comprised of parallel vertical plates including outer plates 85 and inner plates 86 which have a concave transverse contour suitable to receive and cradle the mold, as shown in Figs. 10 and 11. The vertical plates 85 and 86 at the upper end of the inclined trackway have a curved portion with a substantially semi-circular profile forming a hump 109. At the end of the curve, adjacent to the mold-receiving platform, the curve forms a depression 87 with the mold-tumbling surface 84 of the platform 78 to cooperate in inverting the mold, as will be described below.

A mold-pushing mechanism 88 is associated with the mold-receiving platform 65 and includes a hydraulically actuated pusher cylinder 89 which is mounted centrally and pivotally at 90 between the arms of the bracket 91, which in turn is fixed to the mold-receiving platform. The piston rod 92 of the hydraulic cylinder 89 is pivotally mounted at its outer end to the mold pusher member 93. The mold pusher member 93 is slidably mounted in the keyways 94 cut in the vertical plates of the mold-receiving platform 65.

A second mold-pushing mechanism is provided near the lower end of the trackway 67 and includes a hydraulic cylinder 97 which is pivoted centrally at 99 between the arms of the bracket 100. The outer end of the piston rod 101 of the cylinder 97 is pivotally connected to the pusher ram 102. The pusher ram 102 is pivotally mounted at 104, 104a to parallel links 103, 103a, which in turn are pivotally mounted at 105, 105a, to the frame 68 of the trackway 67, the ram being adapted for a reciprocal movement upward between the vertical plates of the trackway 67. While compressed-air-actuated or other driving means may be used for the pushing mechanisms, hydraulic powered devices are described above, since they provide a desirably even and positive movement.

In order to effect the stripping operation with the apparatus shown in Fig. 7 an ingot-containing mold 106 is positioned upright on the horizontal surface 83 of the mold-receiving patform 65. The open end 107 through which the ingot is removable is uppermost. The hydraulic cylinder 89 is actuated so as to cause the piston rod 92 to move outwardly and push the member 93 into engagement with the mold 106. The mold engaging face 116 of the member 93 is provided with a recess to receive the lower lug 108 on the mold 106 so that the face 116 of the member 93 may engage the body of the mold as shown in Fig. 7a. As the piston rod continues to move outwardly it pushes the mold so that the latter slides, in the direction indicated by the arrow, along the horizontal mold-receiving surface 83 to the curved mold-tumbling surface 84 at which point the mold is caused to tip out of the upright position. Thereafter as the member 93 continues to push the mold, the latter tumbles on to its side and the mold lugs 108 become positioned between the inner vertical plates 86 of the trackway 67. The tumbling action, initiated by the pusher member 93, causes the mold to pitch over the hump 109 and begin to slide down the inclined trackway 67. As will be seen, the mold is now in an inverted position, with its open end 107 at the bottom.

At the lower end of the trackway 67 the downward movement of the mold is abruptly stopped by the mold-arresting face 75 of the anvil 74. The ingot 110, which is not intercepted by the anvil, continues downward into the pocket, or opening 111 provided in the anvil 74. Thereafter the hydraulic cylinder 97 is actuated causing the piston rod 101 to move outwardly and thrust the pusher ram 102 upwardly between the inner vertical plates 109 of the trackway 67 into engagement with the side of the mold 106. The continued upward and outward thrust of the ram 102 causes the mold to tumble from the anvil 74 and into the mold-receiving bin 78. The curved corners 111a of the intersecting legs of the anvil faces facilitate the tumbling operation, as do also the upper ends of the trackway plates 112 leading into the bin 78, such ends being disposed (as shown) essentially even with the floor of the anvil recess 111 to provide an abutment against and over which the ingot and mold may be rocked.

As the mold tumbles into the bin 78 it carries with it the ingot which has been unstuck but which remains loosely seated in the mold. Thereafter the ingot and mold, which have thus been tumbled or re-inverted so that they are right side up (with the open end 107 again uppermost), may be removed separately or together by a suitable tong lifting device. It will be understood that although the dotted lines 113 show the mold just upon its turning over into the bin 78, it will usually continue (i. e., rocking clockwise as seen in Fig. 7) into a more upright position with its bottom resting squarely on the nearly horizontal floor portion 114 of the bin.

If the loosened ingot is to be removed separately the tongs engage the sprue, or hot top 115 of the ingot which protrudes from the mold, and pull it out while holding the mold, such operation being essentially the same as one type of procedure employed for stripping non-sticking ingots.

Although the form of the invention shown in Fig. 7 requires the addition of mold tumbling pushers, it has the advantage that the mold may be handled by the crane tongs in the same upright position (i. e., open, or big end up) as is employed for casting, and it is therefore not necessary to go through a separate procedure for inverting the mold both before and after the stripping operation as is the case of the form of the invention shown in Figs. 1, 2 and 3.

A still further form in which the invention may be embodied is shown in Figs. 14 to 19. The apparatus may be supported by a suitable foundation or platform which, as illustrated in the figures, may include an elongated base plate 120 suitably supported, for example, by columns 121. It will be appreciated that, depending upon the weight of the ingots and molds handled by the apparatus, the foundation, or supports, must necessarily be increased to give the proper support to the apparatus.

The apparatus of this form of ingot stripper consists of a central fulcrum stand designated generally as 122 and having side plates 123 supporting a pivotal shaft 124. On one side of the fulcrum stand 122 are guide plates 125 which are pivotally mounted on the shaft 124 so as to swing down into the position shown in Fig. 14. The guides 125 are spaced apart by spacers 126 which are held together by bolts 127. The guide plates are tapered inward at an angle of 45° to form a 90° angle mold slideway wherein molds may rest with two sides in contact with the angular guides 125, and one corner between the guides, as shown in Fig. 15. On the outsides of the guide plates 125 and fastened to them by the bolts 127 which are also used to hold the guide plates together, are two additional guides, wide guide 128 and narrow guide 129. These guides are for the purpose of supporting large molds, particularly those having an oblong shape, such as the mold 130 indicated in dash lines in Fig. 15.

The wide guide 128 is provided with a channel 131 to accommodate the lugs 132 on the side of the mold 130, as shown in Fig. 15. It will be noted that the channel 131 is sufficiently wide to receive the lugs of molds of varying sizes. The guides 125 with their associated guides 128 and 129 are arranged as a unit supported at their upper end by the pivotal connection to the shaft 124 to swing inward toward the fulcrum stand 122 until the back edges 133 of guides 125 come in contact with the stop pin 134 which is mounted in the fulcrum stand 122 between side plates 123. In this position the guides 125 have a predetermined slope to their outer edges 135.

Hinged to the lower end and on the outside of the guides 125, by means of the pivot pin 136, is the mold receiving platform 137 consisting of a wide seat link 138 and a narrow seat link 139. The wide seat link 138 is disposed on the same side of the guide 125 as the wide guide 128, and correspondingly, the narrow seat link 139 is on the same side as the narrow guide 129. The seat links 138 and 139, comprising the mold receiving platform 137, are maintained in parallel spatial relation at their outer end by the spacer 140 and the bolt 141. The mold receiving platform 137 is free to swing upward until its upper faces 142 and 143 of the links 138, 139, respectively, come in contact with the bottom ends 144 and 145 of the guides 128 and 129. The mold receiving platform is free to swing downward until the lower edges 146 and 147 of the links 138 and 139 rest on the upper face 148 of the support 149, which, in turn, rests on the base plate 120 and is bolted thereto by bolts 150.

A rack 151 is pivotally mounted at one end to the links 138 and 139 of the mold receiving platform by means of pivot pin 152. The rack is arranged to mesh with a power driven pinion 153 mounted on shaft 154, which in turn rotates in journals 155 fixedly mounted to the base plate 120 by means of the bolts 156. The rack is maintained in meshing contact by being slidably mounted in the sleeve guide 157 which may be loosely and pivotally mounted on the shaft 154. The pinion 153 may be suitably driven through the shaft 154 by a source of power not shown.

Also mounted on the main pivot shaft 124 are the trackway guides 158 which are shown on the right side of the fulcrum stand 122, in Figs. 14 and 17, and also shown in Fig. 19. These guides are mounted on the shaft 124 on the outside of the guides 125 and are adapted to swing down about the pivot shaft 124 on the right hand side of the fulcrum stand, as viewed in Figs. 14 and 17. Guides 158 are tapered on their outer sides 159, as indicated in Figs. 16 and 19, for clearance of the lugs carried on the molds, such as the lug 160 on the mold 161, as shown in dash lines in Fig. 16. Inside the guides 158 are two other guides 162 which have tapered, or slanted, upper faces 163 and are in line with the guides 125, on the left hand side of the fulcrum stand 122, to form a continuation of the tapered guide faces 135 on the guide plates 125, as shown in Fig. 19.

Also pivoted on the shaft 124 is the ingot stop 165 which is located between the inner guides 162. The ingot stop 165 extends downwardly and has a horizontal bottom face 166 which is arranged to rest on the bottom of a pocket 167 provided in the anvil 168. A wide angle guide 169 and a narrow angle guide 170 are mounted on the outside of guides 158. The angle guides are held together with the outside guides 158 and inner guides 162 and the ingot stop 165 by means of the bolts 171, as best shown in Fig. 16. The wide angle guide 169 is provided with a channel 172 to accommodate the lugs of molds, such as lug 160 of the mold 161, as shown in dash line in Fig. 16, the channel 172 being sufficient to accommodate lugs on molds of varying widths in a manner similar to the channel 131 in the wide guide 128 on the left hand side of the fulcrum stand.

A rack 173 is pivotally connected to the guides 158 by means of the pivot pin 174. The rack is arranged to mesh with pinion 175. The pinion 175 is mounted on shaft 176 which is journaled in the side plates 123 of the central fulcrum stand 122. The rack 173 and the pinion 175 are held in meshing engagement by the guide sleeve 177 which is sized to slidably engage the rack 173 and is pivotally mounted on the shaft 176. The pinion 175 is adapted to be driven by the shaft 176 which may be suitably connected to a source of power (not shown).

The anvil 168 is mounted on the base plate 120 on the right hand side of the fulcrum stand 122 under the guide 158. The upper face 178 of the anvil is disposed at an angle to the horizontal and at right angles to the upper mold receiving faces 163 of the guides 162 when the latter are in the position shown at the right hand side of the fulcrum stand 122 in Fig. 14. The trackway guides 158 and their associated parts are supported at a predetermined angle to the vertical axis of the fulcrum stand 122 by the ingot stop 165 when the bottom edge 166 of the ingot stop is seated in the pocket 167 of the anvil 168. The anvil 168 has an angular opening 180 in its upper face 178, as best shown in Fig. 16. The sides of the opening 180 extend somewhat beyond the profile of the line of the upper face 163 of the guides 162 projected on to the upper face 178 of the anvil 168. Thus the edges or sides of the opening 180 form a ledge 179 on which the upper edge of the mold 161, as shown in Fig. 16, will strike when the stripper is in use but will not interfere with the continued travel of the ingot in to the anvil 168.

In operation, a mold 181, shown in full line on Fig. 14, containing a sticking ingot 182, is lowered by a crane, or other means, and positioned on the seat links 138 and 139 of the mold receiving platform 137 in a substantially vertical position, the mold being seated at a slight angle to the longitudinal center line of the fulcrum stand 122. The sides of the mold 181 are in contact with the lower end of faces 135 of guides 125. When the crane releases the mold 181, the latter seats nearly upright and inclines towards the stripper slightly (as just described) to keep it moving toward the stripper in the event of any movement.

The pinion 153 is then actuated to cause the rack 151 to rise, thereby moving the mold receiving platform 137 in a clockwise direction upward, as indicated by the arrow in Fig. 14, about the pivot pin 136 until the upper faces 142 and 143 of the seat links 138 and 139 respectively contact the lower edges 144 and 145 of the guides 128 and 129. As the mold receiving platform 137 moves upward the mold tips inward toward the fulcrum stand 122 of the stripper to a position where the faces of its sides are in contact with the upper faces 135 of the guides 125, and in contact with the outer guides 128 and 129, as shown in Fig. 15.

As the rack 151 continues its upward movement all the guides on the left hand side of the stripper and the mold receiving platform, together with the mold and ingot, will be caused to rotate in a clockwise upward path about the shaft 124 until the point is reached where the angle of the guides will be such that the mold 181 will start to slide to the right over the peak of the fulcrum stand 122. This position is illustrated by the dash line in Fig. 17.

As the mold begins to slide to the right it will move over the rounded upper ends of the guides 125 and will become over-balanced, causing the mold, together with its ingot, to up-end itself and slide down the trackway at the right side of the fulcrum stand, i. e., in contact with guides 158, 162 and angle guides 169 and 170, until the upper face 183 of the mold 181 strikes the ledge 179 on the upper face 178 of the anvil adjacent the angular opening 180 in the anvil 168. The sudden impact of the mold striking the ledge 179 on the upper face of the anvil stops the travel of the mold 181 and due to the momentum and shock of the impact the ingot 182 is caused to free itself from the mold and to continue its downward movement through the angular opening 180 in the anvil face until the top 184 of the ingot 182 contacts the upper face 185 of the ingot stop 165. Thus the stripping is effected.

The connection of the ingot stop 165 with the shaft 124 is sufficiently loose so that the horizontal bottom face 166 of the ingot stop is well seated in the bottom of the pocket 167 in the anvil and the major portion of the shock of the ingot striking the ingot stop is transferred to the pocket of the anvil and relatively little shock is transferred to the fulcrum strand 122 through the shaft 124.

After the stripping has been effected the mold with the ingot loosely disposed therein is returned to its original position on the mold receiving platform 137 in the following manner:

The pinion 175 is actuated to cause the rack 173 to rise, lifting the lower ends of the trackway guides 158, the ingot stop 165 and their associated parts upward in a counterclockwise motion, carrying the mold and ingot with them to the position shown in full line on the right hand side of the fulcrum stand in Fig. 17. When the guides 158 and their associated parts, and the ingot stop 165 have been elevated to the point shown, which is an angle above the horizontal at which friction is overcome, the mold and the ingot slide to the left across the apex of the fulcrum stand 122. In the meantime the rack 151 has been lowered to position the guides 125 and their associated parts in the position shown by the full line in Fig. 17 so as to receive the mold as the latter passes over the fulcrum stand from right to left, the base of the mold seating itself against the upper faces 142 and 143 of the mold receiving platform 137 with a minimum of impact. Thereafter the rack 151 is lowered so that the guides 125 move down into their initial angular position against the stop 134 and the outer end of the mold receiving platform continues its downward movement until the lower edges 146 and 147 of the mold receiving platform contact the upper face 148 of the support 149, the initial position of said platform.

The mold, containing the loosened ingot, is thereby returned to the nearly upright position shown in Fig. 14 and may be removed readily by a crane, either together with the ingot, or separately, after removing the ingot. After the platform has been cleared, and the rack 173 has been lowered to restore the trackway 158 and its associated parts to the position shown in Fig. 14, the apparatus is prepared to receive another mold for a new stripping cycle.

In the event that the first stripping operation does not succeed in loosening the ingot from the mold, the mold may be returned to the initial position (as shown in Fig. 14) and the stripping operation repeated until the ingot has been loosened.

As noted above, in the stripping of heavy ingots with apparatus of the form described in Figs. 14 to 19, a substantial foundation, such as that shown in the first two described forms, is used to support the apparatus and the part of the foundation under the anvil is provided with wooden timbers to absorb the shock of the stripping operation. Furthermore, it will be understood that although the raising mechanisms illustrated in the drawings and described above were of the rack and pinion type, they may be replaced by hydraulic cylinders or other suitable raising means without changing the operation of the stripper.

In addition to the advantages of the stripping means and methods of this invention, the last described form of apparatus has certain particular advantages. It is capable of processing a large range of sizes or shapes of molds without any change of parts or adjustments. The wide adaptability of the apparatus to molds of different sizes and shapes results from the fact that the molds are cradled in the slideways with two sides of the molds in contact with the faces of the guides and with one corner between the guides. With the molds on an angle, all of them strike the anvil in the same relative way and therefore the one anvil is capable of accommodating the various sizes of molds.

For a clearer understanding of the wide adaptability of the apparatus, reference is made to Fig. 16 wherein it will be noted that the sides 186 and 187 of the mold 161 (shown in dash line) rest in contact with the faces 163 of the guides 162 and the associated parts of guides 158, and that the corner 188 is between the guides. From this it will be seen that either or both of the sides of the mold can extend outwardly from the angular guideway without effecting the position of the mold in the guideway. However, as noted above, the wide angle guide 169 is provided with a channel 172 to receive the mold lugs such as 160, and the channel is sufficiently wide so that molds having lugs at various distances from their corners, depending upon the length of their sides, may be accommodated in the channel 172.

The angle of the guideway and the positioning of the opening 180 in the anvil 168 is such that in addition to the substantially angular shaped molds the apparatus may also handle round shaped molds. The mold arresting ledge 179, i. e., that part of the upper face 173 of the anvil 168 which projects beyond the horizon of the trackway of guides 158 and their associated angle guides (see Fig. 16) is such that it will effectively arrest the various sizes of molds but is sufficiently narrow so that it does not interfere with the passage of ingots into the angular opening 180 when the molds being stripped have relatively thin walls.

In the form of the apparatus shown in Figs. 14 to 19, a further advantage is that no separate equipment is needed to invert the mold prior to the stripping operation, for in that form of the invention the stripper itself up-ends the mold as it raises it for the stripping operation, and after the stripping operation, the mold is re-inverted to its original upright position. Thus the mold can be handled in a normal upright manner with the standard type mold handling equipment, and furthermore, the lifting crane, or other type devices which are used in handling the mold, are out of contact during the stripping operation and consequently are not subject to the shocks incident to said operation.

An additional advantage of the apparatus is that, due to the low position of the loading seat or mold receiving platform 137, in relation to the base plate 120, no great height is necessary for handling the molds as they are moved on and off the stripper, and therefore the apparatus can be used effectively in buildings having low head room.

Furthermore, as noted above, if the ingot does not loosen from the mold with the first impact, the mold and the ingot can be returned to the loading or starting side of the apparatus and the cycle of operation repeated as often as necessary without the help of any outside equipment. Molds of different sizes may be used with the devices of this invention and no special configuration is essential. The devices can be adapted, by changing the shape of the anvil if necessary, to strip ingots within a large range of sizes. The shape of the mold is not critical for molds having rounded or flattened sides may be processed with equal success.

The three forms described and shown in the drawing have been presented as illustrations and it will be understood that many variations in the apparatus may be made without departing from the scope and spirit of the invention.

What is claimed is:

1. Apparatus for removing an ingot from a mold which surrounds the ingot and which has an open end through which the ingot is removable, comprising a downwardly inclined mold-supporting trackway downwardly inclined at a mold-supporting angle for guiding and supporting a moving ingot-containing mold along a downwardly sloping path endwise with the open end in advance and a mold-arresting anvil disposed in said path adapted to abut the end of the mold, said anvil having an opening disposed and sized to permit the passage of the ingot therethrough when the mold has been intercepted by the anvil, the trackway being inclined from the vertical at an angle sufficient for slidably supporting and guiding the mold as it moves downward along said path.

2. Apparatus for stripping an ingot from a mold having an open end through which the ingot is removable, comprising trackway means providing a mold-receiving area and a mold-guiding path inclined from the vertical and downwardly sloping at an angle sufficient to support the mold beyond said area, means for displacing the mold from said area to effect advance of the mold along said path endwise with the open end in advance, mold arresting means disposed in said path to stop the movement of the mold but shaped to define an opening of sufficient size to receive the ingot and thereby to permit the continued movement of the ingot and means for removing the mold from its arrested position at said arresting means, said mold-guiding path being defined by the trackway which is inclined from the vertical whereby the mold is gravitationally maintained in supported sliding contact with the trackway.

3. Apparatus for stripping an ingot from a mold, comprising a platform for receiving said mold in upright position, a downwardly sloping trackway downwardly inclined at a mold-supporting angle adjacent the platform, mold turning means associated with the platform for inverting the mold onto said trackway to permit it to slide down said trackway, an anvil disposed at the lower end of said trackway to arrest the downward movement of the mold, said anvil having an opening therein sized to permit the continued downward travel of the ingot therethrough, a second mold turning means for tumbling said mold out of its position at the end of the trackway abutting the anvil.

4. Apparatus for stripping an ingot from a mold, comprising a platform for receiving said mold in upright position, a downwardly sloping trackway downwardly inclined at a mold-supporting angle adjacent the platform, mold turning means associated with the platform for inverting the mold onto said trackway to permit it to slide down said trackway, an anvil disposed at the lower end of said trackway to arrest the downward movement of the mold, said anvil having an opening therein sized to permit the continued downward travel of the ingot therethrough, mold receiving means below the anvil, including structure to support the mold in upright position, and means shiftable to engage the mold at the anvil, for pushing the mold over into said receiving means and into re-inverted position.

5. An apparatus for stripping an ingot from a mold, comprising, in combination, a trackway downwardly inclined at a mold-supporting angle, a mold receiving platform disposed adjacent one end of the trackway, a mold arresting anvil disposed at the other end of the trackway, mold tumbling means associated with said platform to engage a mold in upright position on the platform and invert it onto said trackway and into sliding engagement therewith, said anvil being shaped to arrest the sliding movement of the mold while permitting the ingot to continue its movement, and a second mold tumbling means to remove the mold from its position adjacent the anvil means, said first mold tumbling means comprising structure between the platform and the trackway over which the mold may be rocked, and means for pushing the mold to and over said structure.

6. An ingot stripping apparatus, comprising a downwardly inclined mold-supporting trackway adapted to guide and define the path of an ingot-containing mold as it slides downwardly endwise, said trackway being inclined from the vertical at an angle to slidably support the mold, an anvil disposed in said path adjacent the lower end of the trackway having a mold arresting face adapted to abut the end of the falling mold, said anvil having an opening larger than the cross-section of the ingot and disposed to permit the passage of the ingot therein when the mold has been intercepted by the anvil face, and said trackway being formed to define a longitudinal groove to receive projections from the side of the mold.

7. An apparatus for stripping an ingot from a mold having an open end through which the ingot is removable comprising, in combination, an inclined trackway defining a path along which an inverted mold may be moved by gravity, endwise with its open end in advance, an anvil disposed in said path having a mold arresting face with an opening therein sized to permit the continued movement of the ingot therethrough when the mold is stopped, and block means removably supporting said anvil with its said face in mold-arresting position, said block means defining a recess of adjustable size adapted selectively to receive and retain anvils of a plurality of sizes for arresting molds of corresponding different sizes, said trackway being inclined from the vertical at an angle for supporting the side of the mold in its descent, and said mold-arresting face of the anvil being disposed at right angles to the profile of the trackway for mold-arresting contact with open end of the mold.

8. An apparatus for stripping ingots from molds comprising a trackway inclined from the vertical at an angle for receiving in sliding supporting engagement, an inverted mold containing an ingot, a mold arresting anvil disposed at the lower end of the trackway adapted to intercept the downwardly sliding mold, said anvil having an opening therein to permit the continued downward movement of the ingot contained in said mold when the downward movement of the mold has been arrested, and means for removably supporting said anvil, said anvil having a plurality of mold-arresting faces defining ingot-receiving entrances to said opening whereby each of said faces is adapted to intercept a mold while permitting movement of the ingot into said opening, the mold-arresting faces being U-shaped with the open ends of adjoining U-shaped faces intersecting to define the ingot-receiving opening, and said supporting means adapted to receive the anvil selectively in each of a plurality of positions respectively locating its said faces in mold-intercepting relation.

9. An ingot-stripping apparatus, in combination, a trackway inclined at a mold-supporting angle from the vertical for guiding and supporting an ingot-containing mold as it falls endwise along a downwardly sloping path defined by the trackway, an anvil disposed alongside the trackway and in the path of such falling mold to arrest the mold and permit the continued fall of the ingot, and individual supporting means for said trackway and for said anvil, separately supporting the same to inhibit transmission of the impact shock of the mold striking the anvil, to the inclined trackway.

10. An apparatus for stripping an ingot from a mold, comprising a downwardly inclined mold-supporting trackway adapted to receive in sliding and supporting engagement an inverted mold containing an ingot, a mold arresting anvil disposed at the lower end of the trackway adapted to intercept the downwardly sliding mold, said anvil defining an opening to permit the continued downward movement of the ingot contained in said mold when the downward movement of the mold has been arrested, said opening being angular so that the adjacent edges of the upper faces of the anvil contact the upper ends of two sides of the mold as the latter moves into engagement with the face of the anvil, said trackway being inclined from the vertical at an angle for supporting the mold while it slides downward, and the upper faces of the anvil being disposed at right angles to the inclined trackway.

11. An apparatus for stripping an ingot from a mold, comprising a trackway downwardly inclined at a mold-supporting angle and a mold-receiving platform disposed adjacent one end of said trackway, a mold-arresting anvil disposed at the other end of the trackway, means for inverting said mold-receiving platform for inverting a mold onto said trackway and into sliding engagement therewith, said anvil being shaped to arrest the sliding movement of the mold while permitting the ingot to continue its downward movement, means for raising said trackway for reinverting the mold and ingot and removing the mold from its position adjacent the anvil, and for returning the mold to its initial position on the mold-receiving platform.

12. An apparatus for stripping an ingot from a mold, comprising a platform for receiving a mold in upright position, a downwardly sloping trackway inclined from the vertical at a mold-supporting angle adjacent the platform, a guide means disposed between said mold-receiving platform and the said trackway, means for initially raising one side of said platform to tilt the mold into engagement with the guide means and for thereafter raising the platform and the guide means to invert the mold onto said trackway to permit it to slide down said trackway, an anvil disposed at the lower end of said trackway to arrest the downward movement of the mold, said anvil having an opening therein sized to permit the continued downward travel of the ingot therethrough, means for raising the lower end of said trackway to reinvert and return the mold to the guide means and thereafter to its initial position on the mold receiving platform, and means associated with the trackway for retaining the mold and ingot on said trackway during the time the lower end of the trackway is being raised.

13. An apparatus for stripping an ingot from a mold, comprising in combination a fulcrum stand, a first and second guideway, said guideways being downwardly sloping in opposite directions from said stand, and pivotally mounted at their upper ends on a common axis of the stand, a platform adapted to receive an ingot containing mold in a substantially upright position associated with the lower end of the first guideway, means for raising the lower end of the first guideway and the mold receiving platform associated therewith to invert the mold positioned on said first guideway and platform into sliding engagement with the second guideway, said second guideway being downwardly inclined at a mold-supporting angle, an anvil disposed at the lower end of the second guideway to arrest the downward movement of the mold, said anvil having an opening therein sized to permit the continued downward travel of the ingot therethrough to loosen it from the mold, means positioned in the opening and associated with the second guideway for limiting the downward travel of the ingot therethrough and means for lifting the lower end of the second guideway together with the ingot limiting means to reinvert the mold and the loosened ingot and return them to the first guideway and mold-receiving platform.

14. An apparatus for stripping an ingot from a mold, comprising means for receiving and supporting an ingot-containing mold which is therein deposited in substantially upright position, said means being movable to an upper position to invert the mold for downward discharge of same in an inverted position, from the said means, guide means adjacent the first-mentioned means, said guide means including a trackway downwardly inclined at a mold-supporting angle, for downwardly guiding the mold discharged therefrom to a predetermined locality, an anvil disposed at said locality and having a face adapted to arrest the mold after downward travel thereof while permitting the ingot to continue downward movement, for loosening the ingot, and stop means below the anvil face for arresting the ingot, said guide and stop means being movable upwardly together for displacing the mold and ingot from the anvil and turning them back into the first-mentioned mold-receiving and supporting means.

15. The method of stripping an ingot from a mold which surrounds the ingot and which has an open end through which the ingot is removable, comprising guiding and supporting the mold on its side along a downwardly sloping path which is inclined from the vertical at a mold-supporting angle for slidably supporting the mold with the open end first to impart momentum thereto, abruptly arresting the mold by engaging a substantial portion of the face of the mold around the open end thereof, whereby the unarrested ingot continues moving under said momentum.

ZEBULON W. WHITEHOUSE.
OSCAR M. SCHULZE.

References Cited in the file of this patent

UNITED STATES PATENTS

| Number | Name | Date |
| --- | --- | --- |
| 2,119,857 | Eppensteiner | June 7, 1938 |
| 2,236,471 | Eppensteiner | Mar. 25, 1941 |
| 2,457,519 | Bemel | Dec. 28, 1948 |

FOREIGN PATENTS

| Number | Country | Date |
| --- | --- | --- |
| 16,904 | Great Britain | 1896 |